United States Patent [19]
Warren

[11] Patent Number: 5,144,193
[45] Date of Patent: Sep. 1, 1992

[54] HIGH FIELD PULSED MICROWIGGLER COMPRISING A CONDUCTIVE TUBE WITH PERIODICALLY SPACE SLOTS

[75] Inventor: Roger W. Warren, Santa Fe, N. Mex.

[73] Assignee: The United State of America as represented by the Department of Energy, Washington, D.C.

[21] Appl. No.: 623,866

[22] Filed: Dec. 7, 1990

[51] Int. Cl.⁵ .................... H01S 3/0959; H01J 23/34
[52] U.S. Cl. .......................................... 315/4; 372/2; 372/37
[58] Field of Search ................. 315/4, 5, 5.35; 372/2, 372/37

[56] References Cited

U.S. PATENT DOCUMENTS

| | | | |
|---|---|---|---|
| 4,283,687 | 8/1981 | Madey et al. | 372/2 |
| 4,331,936 | 5/1982 | Schlesinger et al. | 372/37 X |
| 4,530,096 | 7/1985 | Bekefi et al. | 315/5 X |
| 4,542,510 | 9/1985 | Black, Jr. | 315/5 X |
| 4,727,551 | 2/1988 | Schorlemann | 372/2 |
| 4,876,687 | 10/1989 | Feinstein | 315/5 X |

Primary Examiner—Eugene R. LaRoche
Assistant Examiner—Benny T. Lee
Attorney, Agent, or Firm—Ray G. Wilson; Paul D. Gaetjens; William R. Moser

[57] ABSTRACT

A microwiggler assembly produces large magnetic fields for oscillating charged particle beams, particularly electron beams for free electron laser (FEL) application. A tube of electrically conductive material is formed with radial slots axially spaced at the period of the electron beam. The slots have alternate 180° relationships and are formed to a maximum depth of 0.6 to 0.7 times the tube circumference. An optimum slot depth is selected to eliminate magnetic quadrupole fields within the microwiggler as determined from a conventional pulsed wire technique. Suitable slot configurations include single slits, double slits, triple slits, and elliptical slots. An axial electron beam direction is maintained by experimentally placing end slits adjacent entrance and exit portions of the assembly, where the end slit depth is determined by use of the pulsed wire technique outside the tube.

10 Claims, 6 Drawing Sheets

Prior Art

HIGH FIELD PULSED MICROWIGGLER COMPRISING A CONDUCTIVE TUBE WITH PERIODICALLY SPACE SLOTS

BACKGROUND OF INVENTION

This invention is directed to magnetic wigglers for oscillating charged particle beams and, more particularly, to wigglers formed from non-magnetic materials for generating increased magnetic fields. This invention is the result of a contract with the Department of Energy (Contract No. W-7405-ENG-36).

A common application for wigglers is to accelerate and oscillate electron beams for free electron lasers (FEL's). The photon energy of a light beam output from a FEL is inversely proportional to the wavelength of the light. The light wavelength is related to the electron beam parameters by $$\lambda \simeq (\text{wiggler period})/2y^2,$$

where $y \propto$ energy of the electron beam (e-beam). This relationship illustrates that high energy (short wavelength) laser output requires a wiggler with a small period and/or energetic e-beams. Conventional permanent magnet wigglers are limited with respect to decreasing wiggler periods.

In one exemplary application, there has been considerable interest in FEL's that generate short wavelength light for use in fabricating semiconductor devices. Short wavelength light provides a capability for further compacting the electronic circuitry available on integrated circuits, e.g., to define more narrow conductive paths in photolithography techniques. Conventional permanent magnet wigglers can have periods of less than a few centimeters to generate light of short wavelength, but provide only a low gain because of their low fields.

Ferromagnetic wiggler designs are limited to a maximum field at the magnets of 1 to 2 T, with lower fields on the wiggler axis. A figure of merit for FEL wigglers is $K_{rms}$, defined to be $$K_{rms} = e \cdot B_{rms} \cdot L_w / (2\pi \ m \cdot c),$$

where $B_{rms}$ is the rms value of the wiggler's magnetic field on-axis and $L_w$ is the wiggler period. $K_{rms}$ should be $\geq 1$ for good gain. If $B_{rms}$ is limited to 1 T and $L_w$ is continually reduced, $K_{rms}$ drops below 1 at a period of about 1 cm. If $K_{rms}$ is maintained at 1 while $L_w$ is reduced below 1 cm, B needs to exceed field values that can be produced by ferromagnetic materials. Thus, ferromagnetic materials must be eliminated from the wiggler.

In order to obtain the magnetic fields needed for $K_{rms} = 1$, large currents must be carried in coils. Current densities of the required magnitude (in excess of $10^6$ A/cm$^2$) can be generated by pulsed currents in copper conductors. A suitable conductor configuration must carry large currents close to the wiggler axis; must occupy most of the available space; must be symmetrical to generate a planar electric field; must generate a zero quadrupole field along the axis; and should be relatively easy to manufacture.

FIG. 1 depicts a prior art double helix configuration 16 that has been considered for application to a pulsed wiggler. The double conductors provide symmetry and current carrying capability, but generate a helically polarized field that is not desirable. The wound wire configuration shown in FIG. 1 is also subject to temperature and magnetic stress limitations. The current required to achieve $K_{rms} = 1$ is about 5 kA, and the wire tension is about 1 lb. The corresponding current density and tensile hoop stress increase rapidly as the scale size is reduced. Thus, wire sizes smaller than #18 and pulse lengths longer than 100 μsec have temperature limitations. The breaking limit occurs first for pulses shorter than 100 μsec.

Yet another problem with wire wound microwigglers is the generation of wake field generated by the interaction of the electromagnetic field associated with the moving electrons and non-uniformities in the surrounding boundary conditions. The wake field affect the emittance and energy spread of the e-beam. It is desirable to maintain wake fields as small as possible.

These and other problems of the prior art are addressed by the present invention and a crossed helix-type configuration is provided for use as a pulsed microwiggler. Accordingly, it is an object of the present invention to provide a FEL microwiggler with a period less than 1 cm and a $K_{rms}$ at least equal to one.

It is another object of the present invention to provide a pulsed microwiggler that can sustain current pulses longer than 100 μsec with a current effective to produce a $K_{rms}$ at least equal to one.

One other object of the present invention is to provide a pulsed microwiggler having a zero quadrupole field along the wiggler axis.

Yet another object is to provide a pulsed microwiggler having a plane-polarized magnetic field in the wiggler.

Still another object of the present invention is to provide magnetic field corrections adjacent entrance and exit portions of the microwiggler to maintain an axially directed e-beam.

It is also an object of the present invention to provide a microwiggler configuration that is readily manufactured.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

To achieve the foregoing and other objects, and in accordance with the purposes of the present invention, as embodied and broadly described herein, the apparatus of this invention may comprise a FEL microwiggler for generating an oscillating electromagnetic field along the tube axis. The microwiggler is a tube of conductive, nonferromagnetic material, said tube defining a cylindrical wall disposed longitudinally about an axis and having a predetermined circumference at a fixed radial distance from the axis. The tube wall defined radial slots spaced at a period selected for the electromagnetic field oscillations and directed in alternating 180° relationships. Each slot has at least one slit having a length of 0.6–0.7 times the circumference of the tube and effective to produce a zero quadrupole magnetic field along the axis of the tube.

In particular embodiments, the tube slots are a series of single slits. Alternatively, the slots can be formed from multiple slits. In yet another configuration, the slots can be formed as ellipses. The length of the slits or the ellipses is generally 0.6-0.7 times the tube circumference.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

A microwiggler for a FEL generates high electromagnetic fields, using very high current pulses, and can operate on a harmonic of the fundamental frequency to reach the shortest wavelengths with the lowest electron beam (e-beam) energy. To generate a large field, an electromagnetic wiggler must carry large currents close to its axis. To generate harmonics, the current conductor arrangement must obtain a planar field. A further condition for an electromagnetic wiggler is that a correctly injected e-beam will proceed down the length of the wiggler undergoing wiggles, but without undergoing serious bending or defocusing forces, primarily from quadrupole fields.

Figure 1:
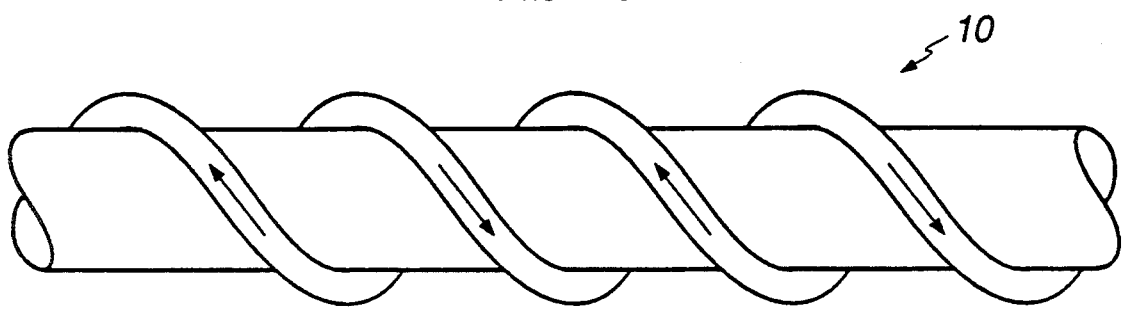
FIG. 1 is a pictorial illustration of a prior art double helix winding configurations for FEL's that produce electromagnetic fields for electron beam oscillation.
Figure 2:
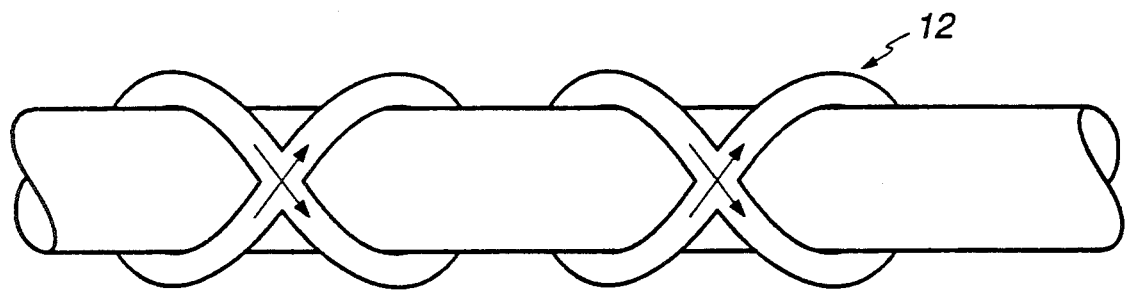
FIG. 2 is a pictorial illustration of a prior art winding configuration that produces a crossed helix current flow.

FIG. 2 depicts another prior art wiggler 12 with a crossed helix conductor winding that has a current flow effective to generate a planar electric field and has special symmetry properties that result in the planar electric field. Wiggler 12 can be configured to provide a zero quadrupole field along the tube axis. However, a wound crossed helix configuration is difficult to fabricate, is sensitive to fabrication tolerances, and is subject to pulse length limitations, along with heating and stress breakage limitations and deleterious wake field interactions, as discussed in the background section.

In accordance with a preferred embodiment of the present invention, it has been found that a slotted cylindrical tube of conducting material can produce a crossed helix-type current flow that generates the required electromagnetic fields with the desired $K_{rms}$ of at least one. The cylindrical tube defines a wall disposed longitudinally about an axis and has a predetermined circumference at a fixed radial distance from the axis. A test wiggler has been designed with the parameters set out in Table A.

TABLE A

| Parameters of Test Wiggler | |
|---|---|
| Parameter | Value |
| period | 3.0 mm |
| inner diameter | 1.0 mm |
| outer diameter | 2.0 mm |
| $N_w$(No. of wiggles) | 25 |
| pulse current | 50 kA |
| $B_{pk}$ | 5 T |
| $K_{rms}$ | 1 |
| pulse length | 100 microsec |
| max. temp. | 130° C. |

Figure 3A:
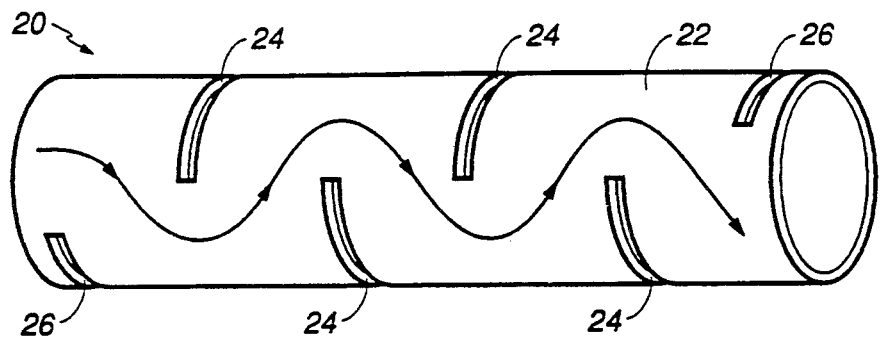
FIGS. 3A, 3B, 3C, and 3D are pictorial illustrations of a wiggler tube for electron beam oscillation according to the present invention.

A single slit slotted tube 20 is shown in FIG. 3A, where conducting tube 22 defines slits 24 that are periodically placed along the axis of tube 22 and alternate radially inward from opposite sides of tube 22 i.e., in an alternating 180° relationship. As hereinafter explained, the depth of slits 24 is selected to eliminate the quadrupole force introduced by the lack of reflection symmetry in all three dimensions. End slits 26 are about one half the depth of the axial slits 24 and are placed to provide end field effects that maintain the axial e-beam direction during entry and exit from tube 22.

Figure 4:
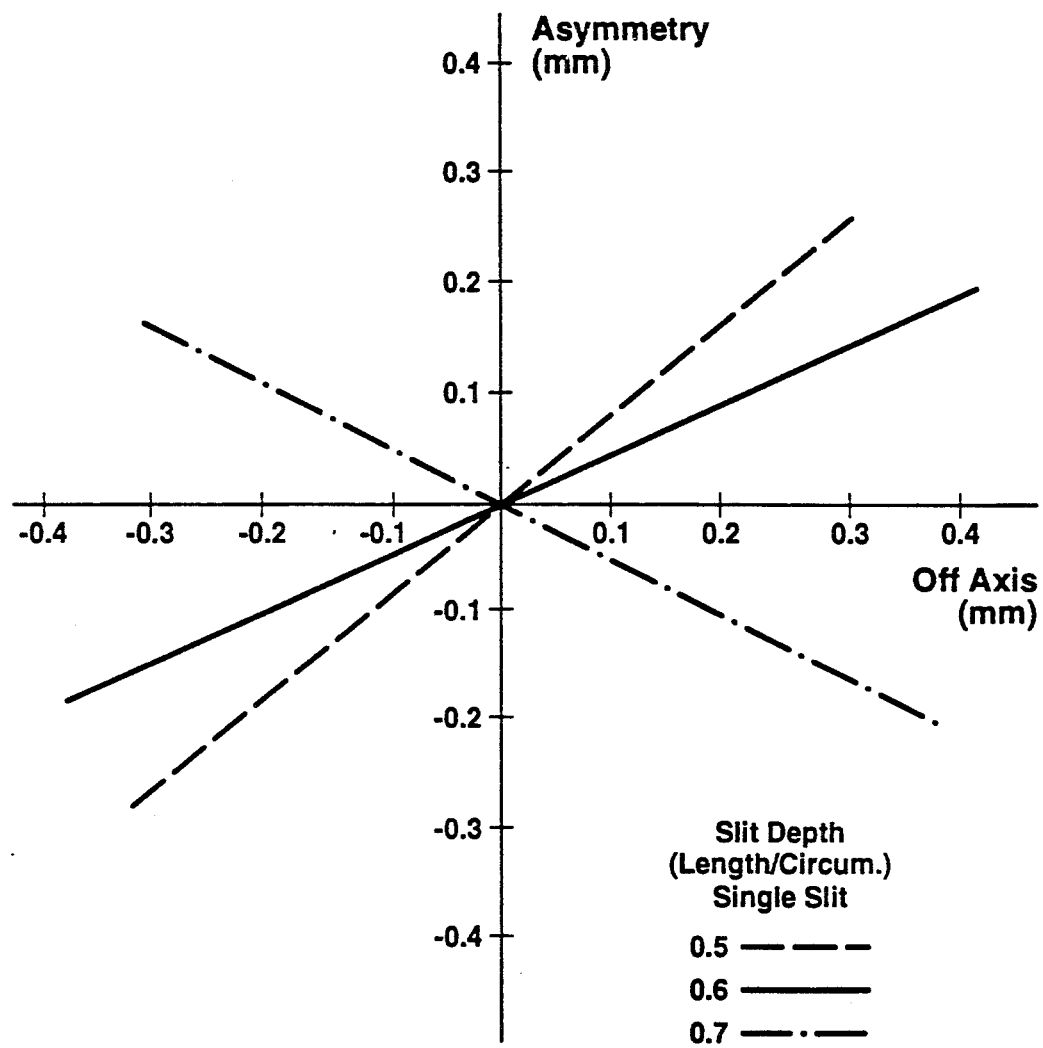
FIG. 4 graphically illustrates electron beam asymmetry for off-axis beams at various slit depths.

It has been found that a slotted tube can be made to produce a zero quadrupole field if the depth of the slit is properly selected. The effects of a quadrupole field are illustrated in FIG. 4 where the degree of beam asymmetry is determined by extensive calculations as well as measurements on models and plotted against the e-beam location relative to the tube axis for different relative slit depths (slit length/tube circumference). The degree of asymmetry is the average bending force experienced by the electron beam. If the e-beam is directed exactly along the tube axis, then no asymmetry results. However, beam assymetry results for off-axis beam injection for all relative slit lengths except for a value between 0.6 and 0.7. Thus, an optimum slit length can be found that generates no quadrupole field.

Figure 3B:
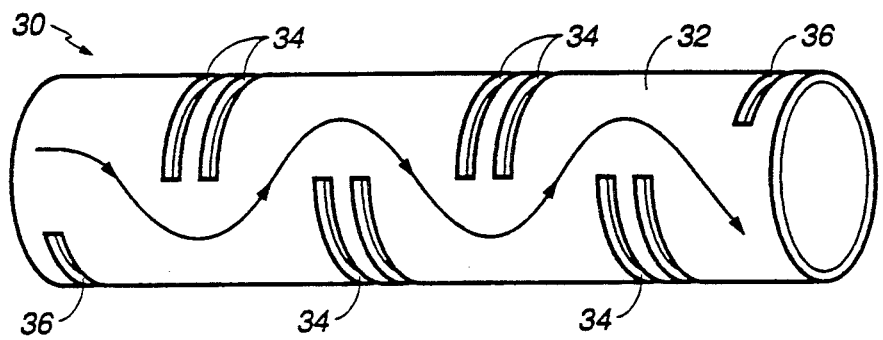
Figure 3C:
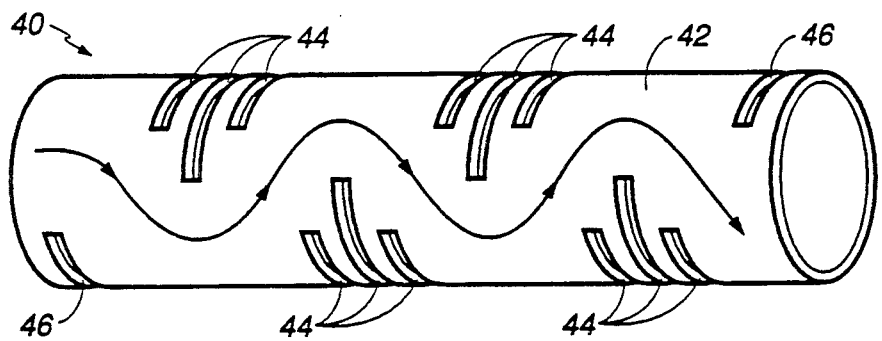
Figure 3D:
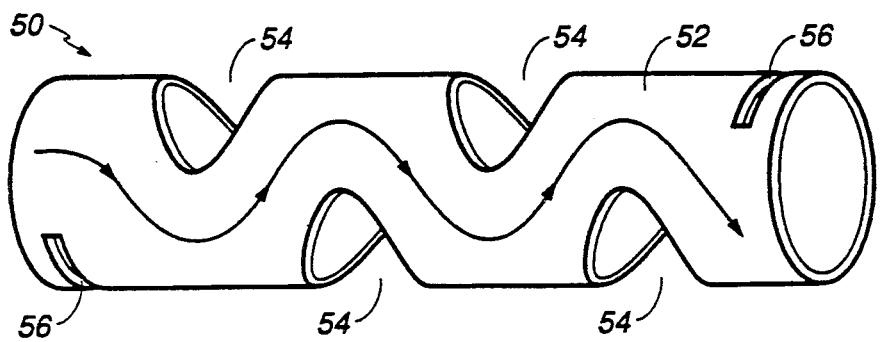

FIGS. 3B, 3C, and 3D are pictorial illustrations of alternate slotted tube configurations with slot arrangements that increase the field strength, maintain a zero quadrupole field, and minimize thermal heating effects. Thermal heating is caused by a singularity in current density adjacent the tip of slits 24 and can be minimized by reducing the crowding of current near the slits.

FIG. 3B is a double slotted tube 30 where both slits 34 are at the optimum depth relative to the circumference of tube 32. End slits 36 are maintained to minimize end effects. FIG. 3C is a triple slotted tube 40 where tube 42 defines periodic triple slits 44 along the tube axis and end slits 46 to account for end effects. The center slit is formed to the optimum depth relative to the circumference and the side slits are about one half the center slit depth. The depth of the side slits is not critical, but is less than the center slit depth. FIG. 3D is an elliptically slotted tube 50 where tube 52 defines elliptical slots 54 that are periodically spaced along the axis of tube 52. End slits 56 are equivalent to end slits 46 shown in FIG. 3C.

The slotted tube configurations shown in FIGS. 3B, 3C, and 3D act to improve the performance of the microwiggler tube. It has been found that these configurations increase the wiggler field strength while simultaneously maintaining a zero quadrupole field. Table B illustrates actual microwiggler geometries that have been built, showing the optimum relative slit depth (length/circumference) and relative field strengths. The exemplary tubes had a circumference/period ratio equal to one. All of the slits were formed with a width of about 3 mils using a conventional electrical discharge machining (EDM) procedure.

TABLE B

| Configuration | Optimum Slit Depth | Relative Field |
|---|---|---|
| Single slit | .61 | 1.0 |
| Double slit* | .61 | 1.3 |
| Triple slit** | .64 | 1.5 |
| 20° ellipse | .61 | 1.7 |
| 30° ellipse | .60 | 1.8 |

*slit separation = 1/6 period
**slit separation = 1/6 period
side slit depth = .4 × circumference It is also noted that the current density at the tip of a slit causes the tip region to heat more rapidly than the rest of the tube. The resulting local increase in resistivity causes the current pattern to shift away from the slit and effectively changes the slit length to generate some net quadrupole field. This problem is minimized by reducing the current density near the end of the slits, for example, by forming multiple slits or opening the slit into an ellipse. Nonuniformities along the interior surface of the wiggler tube generate wake fields and affect the emittance and energy spread of the electron beam. Elliptical slots tend to generate relatively large wake fields, while multiple thin slits generate relatively small wake fields.

As noted above, electromagnetic field measurements are required to optimize the slot geometry design with respect to quadrupole fields end effects. The microwiggler designs discussed herein were optimized using foil tubes with DC current to produce electromagnetic fields and a pulsed-wire field measuring technique; e.g., R. W. Warren, "Limitations on the Use of the Pulsed-Wire Field Measuring Technique,"A272 Nucl. Instr. and Methods, pp. 257-263 (1988); R. W. Warren et al., "New System for Wiggler Fabrication and Testing," proceedings of the Adriatico Research Conference on Undulator Magnets for Synchrotron radiation and Free Electron Lasers, pp. 28-38, World Scientific, New Jersey (1987), both incorporated herein by reference. A zero quadrupole effect is indicated when the integral of the fields perpendicular to the wiggler longitudinal axis is zero when measured along lines parallel to and displaced from the wiggler axis.

End effects are determined by application of the pulsed-wire technique at the end of the wiggler along the tube axis. End effects are directly determined by the direction of wire movement. End slit depths and spacing from the end are adjusted until the measurements indicate that an axial beam direction is maintained, i.e., no net angular deviations from the axial direction.

Figure 5:
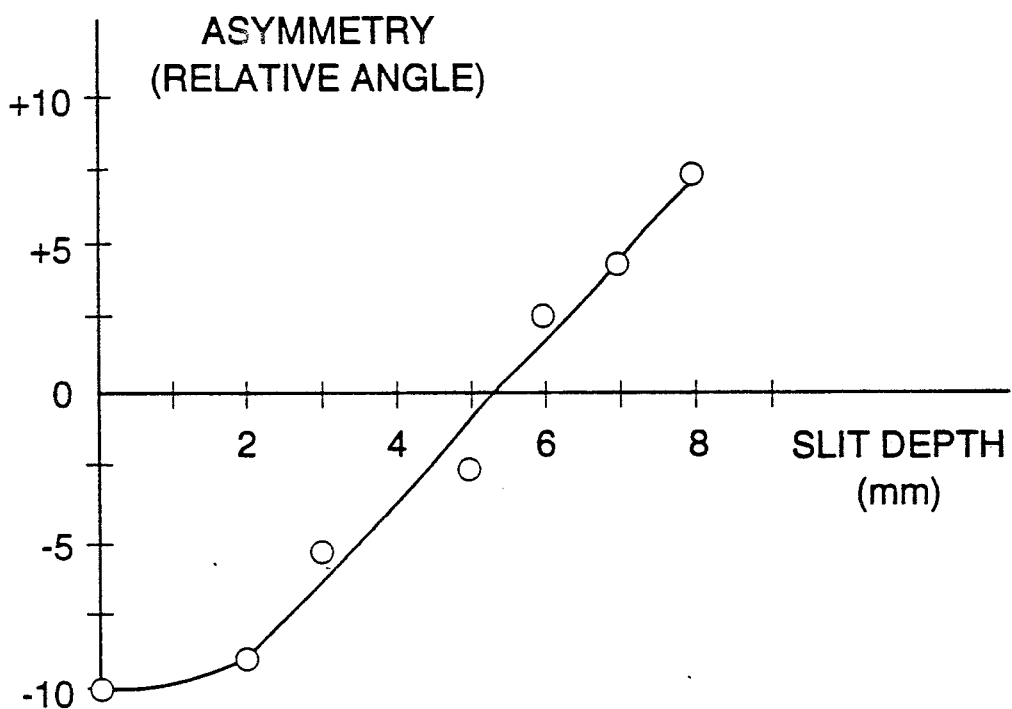
FIG. 5 graphically illustrates the asymmetry as a function of end slit depth for an electron beam exiting a wiggler tube according to the present invention.

FIG. 5 illustrates the field end effects from a single slit-type wiggler having a period of 25.4 mm, inner diameter of about 6.35 mm, and outer diameter of about 12.7 mm. The electron beam exiting along the wiggler axis undergoes a net angular deflection upon leaving the wiggler when no end slit correction is made. The end slit depth is progressively increased and the beam angle is determined by a pulsed-wire technique so that a slit depth for a zero-angle beam can be graphically determined. An end slit depth can be experimentally determined for any given microwiggler slot configuration that will provide an axial beam direction, i.e., zero asymmetry.

The small size of the microwiggler bore and period require that the wire diameter and pulse length be re-duced from the device taught by the Warren references, above. These changes reduced the signal/noise ratio. A tightly focused 5 mw solid state laser diode is now used as the light source to detect wire deflection, along with a low-noise detector. An acceptable signal/noise ratio greater than 100× was obtained.

Figure 6:
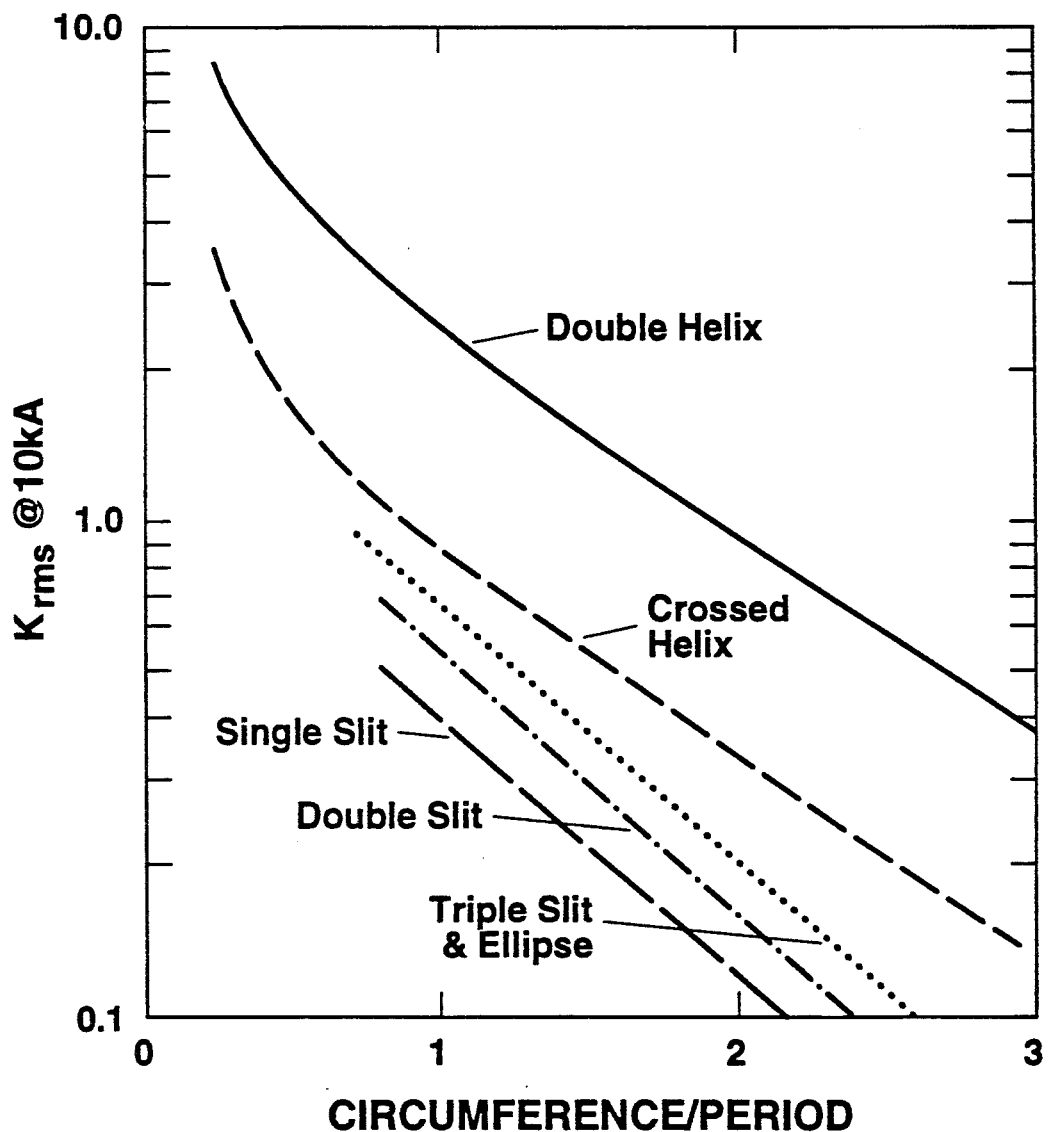
FIG. 6 graphically compares the performance of the wigglers shown in FIGS. 1, 3A, 3B, 3C, and 3D.

Referring now to FIG. 6, the $K_{rms}$ value as a function of the circumference/period for a wiggler is shown for the various configurations discussed above at a current of 10 kA. The $K_{rms}$ value of any configuration depends on its circumference period ratio, but is independent of its size, i.e., if 10 kA produces an adequate $K_{rms}$ value for a wiggler with a 1 cm period, it will produce the same for a wiggler with a 1 m period. There is, however, a shortest period for which a useful $K_{rms}$ can be generated for a useful time interval without overheating. This period is about 3 mm for a 100 μsec pulse, with a corresponding $K_{rms}$ of 1 and a peak field of 5 T. Since $K_{rms}$ increases rapidly as the ratio of circumference to period shrinks, wigglers are preferably built with the smallest possible bore. i.e., the smallest diameter that does not intercept the e-beam.

Microwiggler tubes 22, 32, 42, and 52, depicted in FIGS. 3A, 3B, 3C, and 3D, respectively, have a thickness that obtains a skin depth for current flow that enables the wiggler field to transition to a final condition in a time short compared to the length of the current pulse. The wiggler's field develops first outside the tube due to skin currents, but shifts as the skin currents dissipate to find its final configuration. During this transition, the fields on the axis, i.e., dipole, quadrupole, sextupole, etc. are changing. For copper at room temperature the skin depth D is related to the transition time by $D = \sqrt{t/75}$, where t is in μsec and D is in mm.. Thus, if a current pulse of 100 μsec is involved, t <10 μsec can be realized by choosing D 21 0.4 mm. A value of D close to this limit is desired since smaller values reduce the current and concomitant field in the tube.

Figure 7:
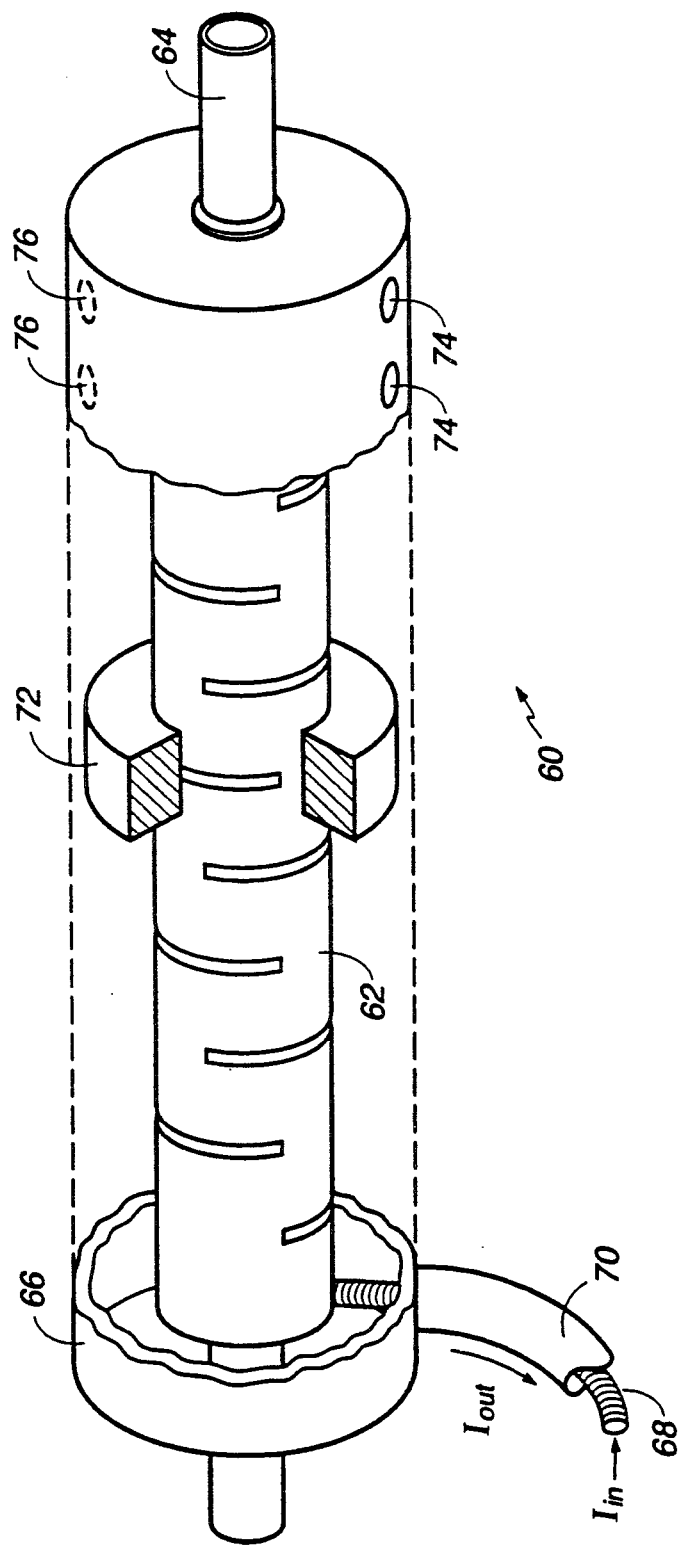
FIG. 7 is a pictorial illustration, in partial cutaway, of a microwiggler assembly according to the present invention.

Referring now to FIG. 7, there is seen a pictorial illustration in partial cutaway of a microwiggler assembly 60 according to the present invention. Vacuum tube 64 is disposed coaxially within slotted wiggler tube 62 to maintain a vacuum for the e-beam travel. It would be preferable, however, to eliminate vacuum tube 64 in order to reduce the circumference of wiggler tube 62. This may be done by filling the wiggler slots with a suitable insulator such as glass or by placing the entire assembly 60 within a vacuum. Conductor 66 surrounds wiggler tube 62 to provide a symmetrical return current flow that generates no interior field. Conductor 66 also advantageously provides for trimming the electromagnetic fields in wiggler 62. Small holes may be drilled in conductor 66 to alter its current distribution, generate weak fields on the axis, and compensate for small errors that are found in the field of wiggler 62 by application of the pulsed-wire technique.

Insulating spacer 72 acts to space conductor 66 from wiggler tube 62 so that conductor 66 may also serve as a cooling jacket for coolant circulation through inlet and outlet ports 74 and 76. Spacer 72 may also be thermally conductive to further remove heat from wiggler 62 by radial conduction to the more massive conductor 66. The use of cryogenic coolants may be required to fully realize the optimum pulse repetition rates of the slotted microwiggler design. A pulsed power supply delivers current I in to wiggler tube 62 through input conductor 68, with a return current path I out from conductor 66 through return conductor 70.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A microwiggler tube responsive to an input current for generating an oscillating electromagnetic field within said tube comprising: a conductive tube defining a cylindrical wall disposed longitudinally about an axis and said cylindrical wall having a predetermined circumference at a fixed radius from said axis, said conductive tube defining slots oriented perpendicular to said axis and spaced along said axis at periodic intervals in alternating 180° relationships to provide a crossed helix current pattern, said slots having at least one slit having a length of 0.6–0.7 times the circumference of said tube and effective to eliminate quadrupole effects in said electromagnetic field.

2. A tube according to claim 1, wherein each of said slots is an elliptical shape have a maximum length of 0.6–0.7 time the circumference of said tube.

3. A tube according to claim 1, wherein each of said slots is a single slit having a length of 0.6–0.7 times the circumference of said tube.

4. A tube according to claim 1, wherein each of said slots is two slits each having a length of 0.6–0.7 times the circumference of said tube.

5. A tube according to claim 1, wherein each of said slots is triple slits with a middle slit having a length of 0.6–0.7 times the circumference of said tube and adjacent slits having a length less than the length of said middle slit.

6. A microwiggler assembly responsive to a pulsed input current for generating an oscillating electromagnetic field, comprising:

a conductive tube defining a cylindrical wall disposed longitudinally about an axis and said cylindrical wall having a predetermined circumference at a fixed radial distance from said axis, said wall having slots oriented perpendicular to said axis axially spaced at periodic intervals along said tube in alternating 180° relationships, said slots each having a length effective to eliminate quadrupole effects in said electromagnetic field; and a conductive cylinder surrounding said tube for return current from said conductive tube.

7. A tube according to claim 6 wherein each of said slots is a single slit having a length of 0.6–0.7 times the circumference of said tube.

8. A tube according to claim 6, wherein each of said slots is two slits each having a length of 0.6–0.7 times the circumference of each tube.

9. A tube according to claim 6, wherein each of said slots is triple slits with a middle slit having a length of 0.6–0.7 times the circumference of said tube and adjacent slits having a length less than the length of said middle slit.

10. A tube according to claim 6, wherein each of said slots is an elliptical shape have a maximum length of 0.6–0.7 times the circumference of said tube.

* * * * *